United States Patent
Sodeyama et al.

(10) Patent No.: US 10,240,295 B2
(45) Date of Patent: Mar. 26, 2019

(54) PITCH-CONTROLLING AGENT AND PITCH-CONTROLLING METHOD

(71) Applicant: HARIMA CHEMICALS, INC., Hyogo (JP)

(72) Inventors: Takuji Sodeyama, Hyogo (JP); Yoshihiro Aikawa, Hyogo (JP); Takahiro Fujiwara, Hyogo (JP)

(73) Assignee: HARIMA CHEMICALS, INC., Hyogo (JP)

( * ) Notice: Subject to any disclaimer, the term of this patent is extended or adjusted under 35 U.S.C. 154(b) by 0 days.

(21) Appl. No.: 15/749,891

(22) PCT Filed: May 29, 2017

(86) PCT No.: PCT/JP2017/019879
§ 371 (c)(1),
(2) Date: Feb. 2, 2018

(87) PCT Pub. No.: WO2017/209037
PCT Pub. Date: Dec. 7, 2017

(65) Prior Publication Data
US 2018/0230652 A1    Aug. 16, 2018

(30) Foreign Application Priority Data

May 30, 2016  (JP) .................................. 2016-107578

(51) Int. Cl.
| | | |
|---|---|---|
| *D21H 21/02* | (2006.01) | |
| *D21H 17/45* | (2006.01) | |
| *C08F 220/56* | (2006.01) | |
| *D21H 17/37* | (2006.01) | |
| *D21H 17/44* | (2006.01) | |

(52) U.S. Cl.
CPC ........... *D21H 21/02* (2013.01); *C08F 220/56* (2013.01); *D21H 17/375* (2013.01); *D21H 17/44* (2013.01); *D21H 17/455* (2013.01)

(58) Field of Classification Search
None
See application file for complete search history.

(56) References Cited

U.S. PATENT DOCUMENTS

| | | | | |
|---|---|---|---|---|
| 3,639,208 A | * | 2/1972 | Varveri ................. | C08F 226/04 162/168.4 |
| 4,404,061 A | * | 9/1983 | Cael ........................ | D21C 9/16 162/76 |
| 5,131,982 A | * | 7/1992 | St. John ................. | D21C 5/022 162/168.2 |
| 5,256,252 A | * | 10/1993 | Sarkar .................... | D21C 5/005 162/164.6 |
| 5,676,796 A | * | 10/1997 | Cutts ...................... | D21H 17/42 162/158 |
| 7,396,874 B2 | * | 7/2008 | Hollomon ................ | C08F 2/32 524/815 |
| 2006/0000570 A1 | | 1/2006 | Song et al. | |
| 2006/0266488 A1 | * | 11/2006 | Doherty ................. | D21H 21/10 162/164.1 |
| 2010/0190679 A1 | | 7/2010 | Vanpachtenbeke et al. | 510/347 |

FOREIGN PATENT DOCUMENTS

| | | |
|---|---|---|
| CN | 101666059 | 3/2010 |
| CN | 101925670 | 12/2010 |
| EP | 0 058 622 | 8/1982 |
| EP | 0 282 081 | 9/1988 |
| JP | 57-149592 | 9/1982 |
| JP | 01-061596 | 3/1989 |
| JP | 2008-505257 | 2/2008 |
| JP | 2010-77567 | 4/2010 |
| WO | 00/34581 | 6/2000 |
| WO | WO 01/74915 A1 * | 10/2001 |
| WO | 2006/003122 | 1/2006 |

OTHER PUBLICATIONS

International Search Report dated Aug. 1, 2017 in International Application No. PCT/JP2017/019879.

* cited by examiner

*Primary Examiner* — Dennis R Cordray
(74) *Attorney, Agent, or Firm* — Wenderoth, Lind & Ponack, L.L.P.

(57) ABSTRACT

Disclosed is a pitch control agent including a (meth)acrylamide-based amphoteric polymer. The (meth)acrylamide-based amphoteric polymer contains 50 mol % or more of (meth)acrylamide, 0.5 to 20 mol % of a diallyldialkylammonium salt; and 0.1 to 14 mol % of an anionic monomer, as copolymerizable monomer components. This pitch control agent is less likely to be affected by a change in a surrounding environment, and therefore can exhibit excellent pitch controllability under various environments in paper production process.

9 Claims, No Drawings

PITCH-CONTROLLING AGENT AND PITCH-CONTROLLING METHOD

TECHNICAL FIELD

The present invention relates to a pitch control agent for preventing pitch trouble in a pulp and paper production process, and a pitch control method using the same.

BACKGROUND ART

A paper production process is roughly divided into a pre-process (pulping process) in which pulp is produced from wood, waste paper, etc., and a post-process (papermaking process) in which sheet-like paper is obtained from pulp. In the pulping process, for example, wood chips are cooked under strong alkaline conditions, and then the obtained pulp is bleached with chlorine, hypochlorite, chlorine dioxide, oxygen, ozone, etc. to improve whiteness. Then, dirt containing degraded products generated during bleaching is washed away by alkali extraction to obtain bleached pulp. In the papermaking process, pulp is spread in a sheet form in a wire part, and is then dehydrated in a press part and dried in a dryer part.

Wood as a raw material of paper contains oils and fats, fatty acids, terpenes, steroids, natural resins, gum-like substances, etc., and these substances remain also in pulp obtained in the pulping process as micron-sized colloidal particles. These colloidal particles agglomerate to form larger particles called "pitch".

Adhesion of pitch to flow pipes, instruments, fan pumps, chests, wires, felts, rolls, etc. in paper production equipment leads to contamination of the equipment. Further, re-adhesion of pitch that has adhered to the equipment to pulp or paper leads to a reduction in paper quality due to stains and defects or to breakage of paper. In order to remove adhered/deposited pitch, it is necessary to stop production lines, which leads to a reduction in productivity and workability. Various pitch control agents are used in the pulping process and the papermaking process in order to prevent such a reduction in productivity or paper quality caused by pitch trouble.

As a pitch control method, a method is known in which substances responsible for pitch (micro-pitch) are adsorbed to a porous inorganic material such as talc or clay, and the porous inorganic material is mixed into paper to remove micro-pitch out of a system. However, such a porous inorganic material is poor in the ability to adsorb micro-pitch and to fix to paper, which leads to pollution of white water and deposition of sludge. Further, the porous inorganic material may cause wear of or damage to papermaking wires.

A method in which a cationic polymer or an amphoteric polymer is added as a pitch control agent to pulp slurry has been proposed as a method for discharging micro-pitch out of a system by fixing micro-pitch to pulp or paper in a state where the micro-pitch is dispersed by preventing its agglomeration. For example, Patent Document 1 and Patent Document 2 disclose methods in which a specific amphoteric polymer is added as a pitch control agent to pulp slurry in the process of papermaking from waste paper pulp.

PRIOR ART DOCUMENTS

Patent Documents

Patent Document 1: JP-A-2010-77567
Patent Document 2: WO 2006/003122

SUMMARY OF THE INVENTION

Problems to be Solved by the Invention

The amphoteric polymers described in Patent Document 1 and Patent Document 2 are pitch control agents mainly used in the process of papermaking from waste paper pulp, and are therefore mainly used in a neutral or acidic environment. Therefore, when applied to a pulping process for producing pulp from wood chips, these amphoteric polymers cannot exhibit satisfactory pitch controllability. Specifically, when such a conventional polymer-based pitch control agent is used in a high-pH environment such as a pulping process or when pH is reduced from that in a high-pH environment, the dispersibility of micro-pitch and the fixability of micro-pitch to pulp are low, and therefore its applicable pH range is limited.

Under the above circumstances, an object of the present invention is providing a pitch control agent that is less likely to receive the influence of a surrounding environment and that has high pitch controllability in both a pulping process and a papermaking process. It is also an object of the present invention to provide a pitch control method using the pitch control agent.

Means for Solving the Problems

As a result of various investigations focusing on the properties of substances responsible for pitch, the present inventors have found that the dispersibility of substances responsible for pitch in water and the fixability of the substances to pulp greatly vary depending on a surrounding environment, and particularly when an alkaline environment is changed to a neutral or acidic environment, the dispersibility is remarkably reduced and the agglomeration of pitch is likely to occur. As a result of further investigations focusing on such properties, the present inventors have found that even when pH is greatly changed, the dispersibility of micro-pitch and the fixability of micro-pitch to pulp can be maintained by using an acrylamide-based amphoteric polymer having a specific monomer composition as a pitch control agent. These findings have led to the completion of the present invention.

A pitch control agent according to the present invention comprises a (meth)acrylamide-based amphoteric polymer. The (meth)acrylamide-based amphoteric polymer contains 50 mol % or more of (meth)acrylamide, 0.5 to 20 mol % of a diallyldialkylammonium salt, and 0.1 to 14 mol % of an anionic monomer as copolymerizable monomer components.

As the anionic monomer, an $\alpha,\beta$-unsaturated carboxylic acid or a salt thereof is preferably used. In particular, an $\alpha,\beta$-unsaturated dicarboxylic acid or a salt thereof is preferred, and an $\alpha,\beta$-unsaturated dicarboxylic acid and an $\alpha,\beta$-unsaturated monocarboxylic acid are particularly preferably used in combination. As the $\alpha,\beta$-unsaturated dicarboxylic acid, itaconic acid is preferred. As the $\alpha,\beta$-unsaturated monocarboxylic acid, acrylic acid is preferred.

In the (meth)acrylamide-based amphoteric polymer, a content of the diallyldialkylammonium salt (cationic monomer) in the copolymerizable monomer components is preferably higher than that of the anionic monomer. The content of the diallyldialkylammonium salt is particularly preferably 1.4 or more in terms of charge ratio with respect to the content of the anionic monomer.

By adding the pitch control agent comprising the (meth)acrylamide-based amphoteric polymer to pulp slurry, the dispersibility of micro-pitch and the fixability of micro-pitch to pulp can be improved. A pitch control method according to one aspect of the present invention comprises adding the pitch control agent to pulp slurry having a pH of 9 or more. The addition of the pitch control agent is performed in, for example, a pulping process. By previously adding the pitch control agent to pulp slurry in an alkaline environment having a pH of 9 or more, even when pH is reduced, the dispersibility of micro-pitch and the fixability of micro-pitch to pulp can be maintained high, that is, excellent pitch controllability is exhibited.

Effects of the Invention

Even when the pitch control agent according to the present invention is used in a high-pH environment such as a pulping process or even when pH is reduced from that in a high-pH environment (even when pH shock is given), the dispersibility of micro-pitch and the fixability of micro-pitch to pulp are maintained. Therefore, the pitch control agent according to the present invention has high pitch controllability not only in a papermaking process but also in a pulping process.

MODE FOR CARRYING OUT THE INVENTION

[(Meth)acrylamide-Based Amphoteric Polymer]

A pitch control agent according to the present invention comprises a (meth)acrylamide-based amphoteric polymer. The (meth)acrylamide-based amphoteric polymer has a (meth)acrylamide unit as a main skeleton, and contains a (meth)acrylamide unit, a cationic monomer unit, and an anionic monomer unit as copolymerizable monomer components. It is to be noted that in this specification, the term "(meth)acrylic" means acrylic and/or methacrylic. The (meth)acrylamide-based amphoteric polymer is obtained by copolymerizing (meth)acrylamide, a cationic monomer, and an anionic monomer.

<(Meth)acrylamide>

Examples of the (meth)acrylamide include acrylamide and methacrylamide. As the (meth)acrylamide, either acrylamide or methacrylamide may be used, or both of them may be used in combination. Preferably, acrylamide is singly used.

The amount of the (meth)acrylamide to be used is 50 mol % or more, preferably 70 to 98 mol %, more preferably 75 to 97 mol %, further preferably 80 to 95 mol % with respect to the total amount of the copolymerizable monomer components constituting the (meth)acrylamide-based amphoteric polymer. By setting the content of the (meth)acrylamide unit to a value within the above range, a pitch control agent can be obtained which is excellent in the ability to disperse micro-pitch and to fix micro-pitch to pulp in a wide pH range.

<Cationic Monomer>

The (meth)acrylamide-based amphoteric polymer contains a diallyldialkylammonium salt represented by the following formula as a cationic monomer component.

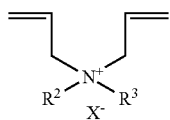

$R^2$ and $R^3$ are each independently a linear or branched alkyl group having 1 to 6 carbon atoms. In particular, a diallyldimethylammonium salt whose $R^2$ and $R^3$ are both methyl groups is preferably used. Examples of $X^-$ include: halogen anions such as fluorine, chlorine, bromine, and iodine; and organic anions such as methyl sulfate anion ($CH_3O_4S^-$). $X^-$ is preferably a halogen anion. More specifically, the (meth)acrylamide-based amphoteric polymer preferably contains a diallyldimethylammonium halide such as diallyldimethylammonium chloride (DADMAC) as a cationic monomer component. A quaternary ammonium salt such as DADMAC maintains its cationic property even under high pH conditions, and is therefore considered to have the effect of neutralizing the negative charge of micro-pitch and contribute to an improvement in the dispersibility and fixability of micro-pitch.

The amount of the diallyldialkylammonium salt to be used is 0.5 to 20 mol %, preferably 1 to 15 mol %, more preferably 2 to 12 mol %, further preferably 3 to 10 mol % with respect to the total amount of the copolymerizable monomer components constituting the (meth)acrylamide-based amphoteric polymer.

<Anionic Monomer>

The (meth)acrylamide-based amphoteric polymer contains an anionic monomer component. Preferred examples of the anionic monomer component include an acid-based monomer having an unsaturated double bond and an acidic group and a salt thereof. Examples of the acidic group include carboxylic acids and sulfonic acids. Examples of the salt of the acid-based monomer include a sodium salt, a potassium salt, and an ammonium salt.

Examples of a sulfonic acid-based monomer having an unsaturated double bond include vinylsulfonic acid, styrenesulfonic acid, 2-acrylamide-2-methylpropanesulfonic acid, and salts thereof. Examples of a carboxylic acid-based monomer having a vinyl group include an α,β-unsaturated carboxylic acid and salts thereof. Examples of the α,β-unsaturated carboxylic acid include: α,β-unsaturated monocarboxylic acids such as (meth)acrylic acid and crotonic acid that are monovalent anionic monomers; and α,β-unsaturated dicarboxylic acids such as maleic acid, fumaric acid, itaconic acid, mesaconic acid, and citraconic acid that are divalent anionic monomers. These anionic monomers may be used singly or in combination of two or more of them, and the anionic monomers different in valence may be used in combination.

The (meth)acrylamide-based amphoteric polymer preferably contains an α,β-unsaturated carboxylic acid as an anionic monomer component. In particular, the (meth)acrylamide-based amphoteric polymer preferably contains an α,β-unsaturated dicarboxylic acid, and more preferably contains both an α,β-unsaturated dicarboxylic acid and an α,β-unsaturated monocarboxylic acid. The α,β-unsaturated dicarboxylic acid is particularly preferably itaconic acid, and the α,β-unsaturated monocarboxylic acid is particularly preferably acrylic acid.

The amount of the anionic monomer to be used is 0.1 to 14 mol %, preferably 0.5 to 10 mol %, more preferably 1 to 5 mol % with respect to the total amount of the copolymerizable monomer components constituting the (meth)acrylamide-based amphoteric polymer.

<Another Monomer Component>

The (meth)acrylamide-based amphoteric polymer may contain another monomer component in addition to the above-described monomer components. Examples of the another monomer component include: monofunctional monomers such as alkyl (meth)acrylate, hydroxyalkyl (meth)acrylate, diacetone acrylamide, styrene, α-methylstyrene, polyalkylene glycol (meth)acrylate, glycerol mono (meth)acrylate, vinylpyrrolidone, vinyloxazoline, vinyl acetate, acryloyl morpholine, and acrylonitrile; and cross-linkable monomers such as divinyl benzene, ethylene glycol di(meth)acrylate, diethylene glycol di(meth)acrylate, triethylene glycol di(meth)acrylate, allyl (meth)acrylate, pentaerythritol tri(meth)acrylate, trimethylolpropane (meth)acrylate, triacrylformal, triallyl isocyanurate, tetraallyloxyethane, alkylene bis(meth)acrylamide, allyl (meth)acrylamide, N-substituted acrylamide, and di(meth)acryloylimide.

The amount of the another monomer component to be used is 30 mol % or less, preferably 10 mol % or less, more preferably 5 mol % or less with respect to the total amount of the copolymerizable monomer components constituting the (meth)acrylamide-based amphoteric polymer.

<Compositional Ratio of Monomers>

The (meth)acrylamide-based amphoteric polymer is represented by, for example, the following general formula (I).

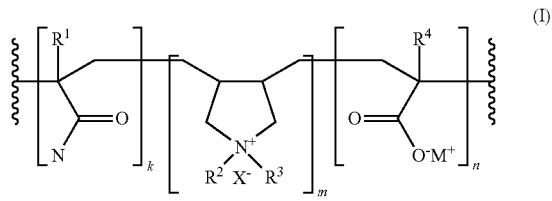

(I)

In the general formula (I), $R^1$ is a hydrogen atom or a methyl group. $R^2$ and $R^3$ are each independently a linear or branched alkyl group having 1 to 6 carbon atoms, and are preferably both methyl groups. $X^-$ is any anion, and is preferably a halide ion. $R^4$ is any nonionic group or anionic group, and is preferably a hydrogen atom, a linear or branched alkyl group having 1 to 6 carbon atoms, or a linear or branched alkylene carboxyl group having 1 to 6 carbon atoms.

k, m, and n represent the contents (mol % with respect to the total amount of the monomer units) of the (meth)acrylamide unit, the cationic monomer unit (diallyldialkylammonium unit), and the anionic monomer unit (α,β-unsaturated carboxylic acid unit), respectively. k+m+n is preferably 70 or more, more preferably 90 or more, further preferably 95 or more.

k is 50 or more, preferably 70 to 98, more preferably 75 to 97, further preferably 80 to 95. m is 0.5 to 20, preferably 1 to 15, more preferably 2 to 12, further preferably 3 to 10. n is 0.1 to 14, preferably 0.5 to 10, more preferably 1 to 5.

The content m of the cationic monomer unit is preferably larger than the content n of the anionic monomer unit, and m is preferably twice or more n. m+n is preferably 1 to 30, more preferably 2 to 25, further preferably 5 to 20.

The content of the diallyldialkylammonium salt as a cationic monomer unit is preferably 1.4 times or more in terms of charge ratio with respect to the content of the anionic monomer unit. For example, when the anionic monomer unit is a monovalent anion such as acrylic acid, m is preferably 1.4 times or more n. When the anionic monomer unit is a divalent anion such as itaconic acid, m is preferably 2.8 times or more n. When the anionic monomer unit contains two or more anionic monomer units different in valence, the ratio between m and n is preferably adjusted depending on the valence of ion of each monomer unit so that the positive charge amount of the cationic monomer unit is 1.4 times the negative charge amount of the anionic monomer unit. The upper limit of the charge ratio of the content of the cationic monomer unit to the content of the anionic monomer unit is not particularly limited, but is preferably 20 or less, more preferably 10 or less.

The use of the (meth)acrylamide-based amphoteric polymer containing the monomer components in a ratio within the above range as a pitch control agent makes it possible to disperse micro-pitch to prevent formation of larger pitch particles due to agglomeration and also makes it possible to fix micro-pitch together with the polymer to pulp to discharge the micro-pitch out of a system. Further, when containing the monomer components in a ratio within the above range, the (meth)acrylamide-based amphoteric polymer is less likely to be affected by a change in a surrounding environment such as pH or electric conductivity, and therefore can exhibit excellent pitch controllability in both a pulping process and a papermaking process.

The monomer components of the (meth)acrylamide-based amphoteric polymer may be arranged in a random or block manner. The weight-average molecular weight of the (meth)acrylamide-based amphoteric polymer is, for example, about 100,000 to 20,000,000, preferably 500,000 to 15,000,000, more preferably 1,000,000 to 10,000,000. The arrangement of the monomer components in the polymer and the weight-average molecular weight of the polymer can be controlled by the types of monomer components to be used, the amount of a polymerization initiator or change transfer agent to be used, or reaction conditions.

<Polymerization Method>

The (meth)acrylamide-based amphoteric polymer is obtained by copolymerizing the above monomer components. A polymerization method is not particularly limited, and various polymerization methods such as thermal polymerization and photopolymerization can be used. For example, a copolymer is obtained by charging monomers and a solvent into a reaction vessel together with a polymerization initiator, a chain transfer agent, or the like used if necessary and heating the mixture to allow polymerization to proceed. The total amount of the monomer components may be charged at one time or in two or more batches. Further, the polymerization reaction may be allowed to proceed while part or all of the polymerization initiator or chain transfer agent is added dropwise to the reaction vessel.

The solvent is not particularly limited as long as it can dissolve the monomer components, and examples thereof include: water; ketones such as acetone and methyl ethyl ketone; alcohols such as methanol, ethanol, propanol, isopropanol, and butanol; glycol ethers such as ethylene glycol monoethyl ether and propylene glycol monomethyl ether; and ester ethers such as propylene glycol monomethyl ether acetate. Among them, water is preferred. It is to be noted that when tap water is used as a polymerization solvent, metals may be removed using a chelating agent such as EDTA. The amount of the solvent to be used may be adjusted so that the concentration of the polymer in a polymerization solution is about 10 to 50% by mass.

The polymerization initiator is preferably a thermal radical generator such as a peroxide-based compound, an azo-based compound, a sulfide, a sulfine, or a sulfinic acid. Among them, a peroxide-based compound is preferred. It is to be noted that the peroxide-based compound may be used in combination with a reducing agent so as to act as a redox polymerization initiator. Examples of the peroxide-based compounds include organic peroxides and inorganic peroxides. Among them, persulfates such as sodium persulfate, potassium persulfate, and ammonium persulfate are preferred. The amount of the polymerization initiator to be added is preferably 0.01 to 10 parts by mass, more preferably 0.05 to 5 parts by mass per 100 parts by mass of the total of the monomer components.

The chain transfer agent has the function of receiving a radical from a growing polymer chain to stop the extension of a polymer, and the chain transfer agent that has received a radical has the function of attacking a monomer to restart polymerization. The use of the chain transfer agent makes it possible to prevent an increase in the molecular weight of a polymer without reducing the radical concentration in a reaction system. Further, the use of the chain transfer agent tends to make a molecular weight distribution (Mw/Mn) small, which makes it possible to obtain a polymer that is excellent in solubility in solvents or flowability even when having a high molecular weight. Examples of the chain transfer agent include: (meth)allyl compounds; mercapto compounds such as mercaptoethanol, thiourea, thioglycolic acid, mercaptopropionic acid, thiosalicylic acid, thiolactic acid, aminoethanethiol, thioglycerol, and thiomalic acid; and isopropyl alcohol. The amount of the chain transfer agent to be added is preferably 0.01 to 10 parts by mass per 100 parts by mass of the total of the monomer components.

Polymerization conditions vary depending on the types of monomer components, polymerization initiator, solvent etc. to be used. However, the temperature of polymerization is preferably 30 to 110° C., more preferably 50 to 100° C. The time of polymerization is, for example, 0.5 to 24 hours, preferably 1 to 12 hours. The polymerization reaction may be stopped by adding a reducing agent, such as sodium sulfite, to a reaction system. The solution after polymerization may be subjected to polymer purification, removal of unreacted monomers, concentration adjustment, etc., if necessary, but may be directly used as a pitch control agent.

The pitch control agent is preferably provided in the form of a solution of the (meth)acrylamide-based amphoteric polymer. Examples of a solvent used for the pitch control agent include the same solvents as those exemplified above with reference to the polymerization solvent. The pitch control agent is used by adding it to pulp slurry, and therefore the solvent of the pitch control agent is particularly preferably water. An aqueous polymer solution obtained by synthesizing the (meth)acrylamide-based amphoteric polymer in water may be directly used as a pitch control agent. The pitch control agent may contain, in addition to the (meth)acrylamide-based amphoteric polymer and the solvent, any component such as a pH adjuster, a surfactant, a viscosity modifier, a rust inhibitor, an antioxidant, an antistatic agent, a preservative, or a defoaming agent. The concentration of the polymer in the pitch control agent is not particularly limited as long as the polymer can be dissolved in the solvent, and may be adjusted in the range of, for example, 1 to 50% by mass.

[Pitch Control Method]

Pitch control (prevention of pitch trouble) is performed by adding the pitch control agent (the (meth)acrylamide-based amphoteric polymer or a solution thereof) according to the present invention to pulp slurry in a pulping process or paper making process. Although a place where the pitch control agent is to be added is not particularly limited, the pitch control agent is preferably added to pulp slurry in a place where pitch trouble occurs or a place located upstream therefrom. In particular, in the present invention, the pitch control agent is preferably added to pulp slurry in a place located upstream from a place where pitch trouble occurs in a pulping process.

The amount of the pitch control agent to be added may be appropriately determined according to the type of raw material of pulp or the type of equipment to be used, etc. The amount of the (meth)acrylamide-based amphoteric polymer per 100 parts by mass of the solid content of pulp is usually about 0.001 to 5 parts by mass, preferably about 0.005 to 1 part by mass.

The addition of the pitch control agent to pulp slurry makes it possible to disperse micro-pitch and prevent pitch trouble caused by the agglomeration of micro-pitch. The reason why the agglomeration of pitch can be prevented by the pitch control agent is that the negative charge of micro-pitch is neutralized by a cationic group in the (meth)acrylamide-based amphoteric polymer. Further, the (meth)acrylamide-based amphoteric polymer has an anionic group in addition to the cationic group, and therefore can efficiently neutralize the charges of various substances responsible for pitch without depending on a pH environment, which is also considered to contribute to an improvement in pitch controllability.

The (meth)acrylamide component content of the amphoteric polymer is high, and therefore a hydrophilic polyion complex is likely to be formed. This polyion complex is considered to act as a protective colloid that prevents the agglomeration of micro-pitch. The polyion complex is easily fixed to (immobilized on) the fiber surface of pulp, and therefore can fix micro-pitch to pulp, which makes it possible to discharge micro-pitch together with pulp to the downstream of a process. Therefore, an increase in the concentration of micro-pitch in a system is prevented, which is also considered to contribute to prevention of pitch trouble.

The dispersibility of micro-pitch derived from wood, such as oils and fats, fatty acids, terpenes, steroids, natural resins, and gum-like substances, is higher at a higher pH and a lower electric conductivity, and tends to reduce as pH reduces or electric conductivity increases. By adding the pitch control agent in an environment where the dispersibility of micro-pitch is high, a protective colloid is formed by the amphoteric polymer around micro-pitch so that the agglomeration of pitch is prevented. The (meth)acrylamide-based amphoteric polymer contained in the pitch control agent according to the present invention can maintain its properties in a wide pH range. Therefore, once a protective colloid is formed by the pitch control agent, the protective colloid is maintained even when an environment change is caused by, for example, pH shock so that the dispersibility of pitch is reduced, and therefore the agglomeration of pitch tends to be prevented.

In a pulping process, wood chips are cooked under strong alkaline conditions of pH 9 or more (generally, at a pH of about 10 to 13) to obtain pulp slurry. When such an alkaline environment is changed to a neutral or acidic environment with a pH of 8.5 or less in the subsequent bleaching or papermaking process, the dispersibility of pitch is reduced so that pitch trouble is more likely to occur. However, when the pitch control agent is previously added to pulp slurry in an alkaline environment where the dispersibility of pitch is high (for example, in an environment with a pH of 9 or more, preferably 10 or more), micro-pitch dispersed in water is coated with a protective colloid formed by the amphoteric polymer. Therefore, even when the pH is reduced to, for example, 8.5 or less, the protective colloid is maintained so that the agglomeration of pitch is prevented, and micro-pitch can be discharged out of a system in a state where it is fixed to pulp together with the amphoteric polymer.

In the present invention, from the above viewpoints, the pitch control agent is preferably added to pulp slurry in an alkaline environment such as a pulping process. The pitch control agent added in a pulping process is fixed to pulp together with micro-pitch, and is therefore sent to the downstream of the process together with pulp slurry. Therefore, the pitch control agent can exhibit pitch controllability also in a place located downstream from a place where the pitch control agent is added.

EXAMPLES

Hereinbelow, the present invention will be specifically described with reference to examples, but the present invention is not limited to the following examples.

[Production of Polymer by Polymerization (Preparation of Pitch Control Agent)]

A total of 100 parts by mass (70% by mass of the total amount) of monomer components shown in Table 1 and 1 part by mass of sodium methallylsulfonate as a chain transfer agent were diluted with tap water to a concentration of 30% by mass. This aqueous solution was charged into a 500 mL-separable flask, and sulfuric acid was added to adjust its pH to 2.5. The temperature of the solution was raised to 60° C. while nitrogen was continued to be blown into the solution, and ammonium persulfate was added dropwise as a polymerization initiator to perform polymerization. Five minutes after the temperature reached 95° C. due to temperature rise caused by polymerization, a total of 43 parts by mass (30% by mass of the total amount) of the monomer components was added dropwise in the same ratio as the initial charging.

After the completion of dropwise addition of the monomer components, ammonium persulfate as a polymerization initiator was added until the viscosity of the solution reached about 10000 mPa·s, and the reaction was continued at about 85° C. for 3 hours. Then, sodium sulfite as a reducing agent and dilution water were added, and the reaction was terminated by cooling to obtain an aqueous solution of an acrylamide-based polymer (solid content concentration: 21.9% by mass).

[Addition of Pitch Control Agent to Pulp Slurry]
<Preparation of Pitch-Containing Pulp Slurry (pH 11) and Addition of Pitch Control Agent>

First, 1 g of absolute dry bleached kraft pulp was dispersed in 300 mL of distilled water adjusted to a pH of 11 and an electric conductivity of 4300 μS/cm using sodium hydroxide and sodium hydrogen carbonate to prepare 0.33% by mass pulp slurry. Then, 1.0 g of a 50% by mass pitch solution (50% by mass with respect to pulp) obtained by dissolving tall oil pitch in tetrahydrofuran was added to the pulp slurry in which pulp was sufficiently dispersed by a stirrer. To this pitch-containing pulp slurry, 0.01 g (0.01% by mass with respect to pulp) of each of the pitch control agents of Examples and Comparative Examples was added in a solid form, and the mixture was stirred for 3 minutes. Then, 5% by mass sulfuric acid was added to adjust the pH of the mixture to 7.

[Evaluation]

The pulp slurry to which each of the pitch control agents of Examples and Comparative Examples had been added was poured onto No. 5A filter paper (diameter: 110 mm), and was subjected to suction filtration to be separated into pulp and water. The filter paper to which the pulp adhered was dried in a drum dryer adjusted to 105° C. for 3 minutes to prepare a sample for evaluation, and the sample was subjected to dispersibility evaluation by visual observation and fixability evaluation using a whiteness meter according to the following criteria.

<Evaluation of Dispersibility>

A brown agglomerate (pitch) remaining on the filter paper of the sample for evaluation was visually observed, and the size of the agglomerate was evaluated according to the following criteria. A higher evaluation score (a smaller size of an agglomerate) indicates superior dispersibility of pitch.

5: No agglomerate with a diameter of 0.5 mm or more was observed.
4: An agglomerate with a diameter of 0.5 to 1 mm was observed.
3: An agglomerate with a diameter of 1 to 2 mm was observed.
2: An agglomerate with a diameter of 2 to 3 mm was observed.
1: An agglomerate with a diameter exceeding 3 mm was observed.

<Evaluation of Fixability>

The ISO whiteness (L value) of the sample for evaluation was measured using a spectrophotometric colorimeter (PF-10, manufactured by NIPPON DENSHOKU INDUSTRIES CO., LTD.), and the average value of L values in three positions was used as an index of fixability. A higher evaluation score (lower L value) indicates superior fixability of pitch, which means that the amount of pitch fixed to pulp is larger and the amount of pitch released in water is smaller.

3: The L value was less than 70.
2: The L value was 70 to 80.
1: The L value exceeded 80.

REFERENCE EXAMPLES

Preparation of pulp slurry and addition of a pitch solution were performed in the same manner as described above except that distilled water adjusted to a pH of 7 and an electric conductivity of 4300 μS/cm using sodium hydrogen carbonate and sulfuric acid was used. Then, the pitch control agent of Example 2, Example 5, or Comparative Example 1 was added, and the mixture was stirred for 3 minutes. Then, evaluations of dispersibility and fixability were performed in the same manner as described above.

The composition (copolymerizable monomer components) and the charge ratio of cationic monomer content to anionic monomer content of each of the pitch control agents of Examples and Comparative Examples and evaluation results are shown in Table 1. The pH shown in Table 1 is the pH at the time of addition of the pitch control agent. In the cases of Example 2, Example 5, and Comparative Example 1, the results of Reference Examples in which the pitch control agent was added at pH 7 are also shown. It is to be noted that the abbreviations of components shown in Table 1 are as follows.

DADMAC: Diallyldimethylammonium chloride
DMQ: Acryloyloxyethyltrimethylammonium chloride
DMBC: Acryloyloxyethyl benzyl dimethyl ammonium chloride
AA: Acrylic acid
IA: Itaconic acid
AM: Acrylamide

TABLE 1

| | Monomer composition (mol %) | | | | | | Cation/Anion | | Evaluation | |
|---|---|---|---|---|---|---|---|---|---|---|
| | Cation | | | Anion | | | | | | |
| | DADMAC | DMQ | DMBC | AA | IA | AM | charge ratio | pH | Dispersibility | Fixability |
| Example 1 | 1.0 | — | — | 1.0 | — | 98.0 | 1.0 | 11 | 3 | 2 |
| Example 2 | 5.5 | — | — | 5.5 | — | 89.0 | 1.0 | 11 | 3 | 3 |
| | | | | | | | | 7 | 3 | 3 |
| Example 3 | 12.0 | — | — | 12.0 | — | 76.0 | 1.0 | 11 | 3 | 2 |
| Example 4 | 5.5 | — | — | 2.5 | — | 92.0 | 2.2 | 11 | 4 | 2 |
| Example 5 | 5.5 | — | — | — | 1.8 | 92.7 | 1.5 | 11 | 4 | 3 |
| | | | | | | | | 7 | 4 | 3 |
| Example 6 | 5.5 | — | — | 1.2 | 1.2 | 92.1 | 1.5 | 11 | 5 | 3 |
| Example 7 | 7.5 | — | — | 0.8 | 0.8 | 91.0 | 3.3 | 11 | 5 | 3 |
| Comparative Example 1 | 92.5 | — | — | 2.5 | — | 5.0 | 37 | 11 | 1 | 2 |
| | | | | | | | | 7 | 3 | 2 |
| Comparative Example 2 | 15.0 | — | — | 15.0 | — | 70.0 | 1.0 | 11 | 2 | 1 |
| Comparative Example 3 | 5.5 | — | — | — | — | 94.5 | — | 11 | 2 | 2 |
| Comparative Example 4 | — | — | — | 5.5 | — | 94.5 | 0 | 11 | 2 | 1 |
| Comparative Example 5 | — | 4.0 | 8.0 | 3.0 | 2.0 | 83.0 | 1.7 | 11 | 2 | 1 |

When the polymer of Comparative Example 1 mainly containing DADMAC as a cationic monomer was added to the pulp slurry with pH 7 (Reference Example), the dispersibility was relatively good and rated as 3. However, when the polymer of Comparative Example 1 was added to the pulp slurry with pH 11 and then the pH was reduced to 7, agglomeration of pitch occurred. This result reveals that the polymer of Comparative Example 1 can be used as a pitch control agent in a neutral environment, but is not suitable for use in a high-pH environment such as a pulping process or in a process in which a pH change is caused by a change from an alkaline environment to a neutral or acidic environment.

Also when each of the polymer of Comparative Example 2 whose content of acrylic acid as an anionic monomer component was high, the polymer of Comparative Example 3 containing no anionic monomer component, the polymer of Comparative Example 4 containing no cationic monomer component, and the polymer of Comparative Example 5 using different kinds of cationic monomers was added to the pulp slurry with pH 11 and then the pH was reduced to 7, the dispersibility of pitch (5-point scale) was poor and rated as 1 or 2.

On the other hand, when each of the polymers of Examples 1 to 7 was used as a pitch control agent, the dispersibility was high and rated as 3 or higher. Further, when each of the polymers of Examples 1 to 7 was used, the fixability (3-point scale) was rated as 2 or 3, which reveals that these polymers have an excellent ability to fix micro-pitch to pulp to discharge the micro-pitch out of a system.

When each of the polymer of Example 2 and the polymer of Example 5 was added to the pulp slurry with pH 7 (Reference Example), the dispersibility and the fixability were as high as those when it was added to the pulp slurry with pH 11. These results reveal that the performance of the pitch control agent according to the present invention is less likely to be degraded by an environmental change, and therefore the pitch control agent according to the present invention can be used in a wide pH range.

Focusing on the evaluation results of the dispersibility, when each of the polymers of Examples 1 to 3 containing equal amounts of a cationic monomer component and an anionic monomer component and having a charge ratio between them of 1 was added, the dispersibility was rated as 3, whereas when each of the polymers of Examples 4 to 7 having a high charge ratio of cationic monomer content to anionic monomer content was added, the dispersibility was rated as 4 or higher. From these results, it can be said that the amphoteric acrylamide-based polymer having a high cation component content is particularly excellent in the ability to disperse pitch. In particular, when each of the polymers of Examples 6 and 7 using, as anionic monomer components, acrylic acid that is an α,β-unsaturated monocarboxylic acid and itaconic acid that is an α,β-unsaturated dicarboxylic acid was added, the dispersibility and the fixability were both particularly excellent. That is, the polymers of Examples 6 and 7 had high pitch controllability.

The invention claimed is:

1. A pitch control agent comprising a (meth)acrylamide-based amphoteric polymer, wherein
    the (meth)acrylamide-based amphoteric polymer contains as copolymerizable monomer components: 50 mol % or more of (meth)acrylamide; 0.5 to 20 mol % of a diallyldialkylammonium salt; and 0.1 to 14 mol % of an α,β-unsaturated carboxylic acid or a salt thereof, and
    the α,β-unsaturated carboxylic acid includes itaconic acid, wherein the molar content of diallyldialkylammonium salt in the amphoteric polymer is higher than the molar content of the α,β-unsaturated carboxylic acid or salt thereof in the amphoteric polymer.

2. The pitch control agent according to claim 1, wherein a content of the diallyldialkylammonium salt in the copolymerizable monomer components constituting the (meth)acrylamide-based amphoteric polymer is 1.4 or more in terms of charge ratio with respect to a content of the anionic monomer.

3. The pitch control agent according to claim 1, wherein the α,β-unsaturated carboxylic acid further includes an α,β-unsaturated monocarboxylic acid or a salt thereof.

4. The pitch control agent according to claim 1, wherein the α,β-unsaturated monocarboxylic acid further includes acrylic acid.

5. A pitch control method, wherein the pitch control agent according to claim 1 is added to a pulp slurry.

6. The pitch control method according to claim 5, wherein the pitch control agent is added in a pulping process.

7. The pitch control method according to claim 6, wherein the pitch control agent is added to the pulp slurry of pH 9 or more in the pulping process, and the pH of the pulp slurry is thereafter reduced to 8.5 or lower.

8. The pitch control method according to claim 5, wherein a pH of the pulp slurry is 9 or more.

9. The pitch control method according to claim 5, wherein after the pitch control agent is added to the pulp slurry, a pH of the pulp slurry is reduced from 9 or higher to 8.5 or lower.

* * * * *